(12) United States Patent
Erivantcev et al.

(10) Patent No.: US 10,509,464 B2
(45) Date of Patent: Dec. 17, 2019

(54) TRACKING TORSO LEANING TO GENERATE INPUTS FOR COMPUTER SYSTEMS

(71) Applicant: Finch Technologies Ltd., Fish Bay, Tortola (VG)

(72) Inventors: Viktor Vladimirovich Erivantcev, Ufa (RU); Rustam Rafikovich Kulchurin, Ufa (RU); Alexander Sergeevich Lobanov, Ufa (RU); Iakov Evgenevich Sergeev, Ufa (RU); Alexey Ivanovich Kartashov, Moscow (RU); Daniil Olegovich Goncharov, Ufa (RU)

(73) Assignee: FINCH TECHNOLOGIES LTD., Fish Bay, Tortola (VG)

( * ) Notice: Subject to any disclaimer, the term of this patent is extended or adjusted under 35 U.S.C. 154(b) by 89 days.

(21) Appl. No.: 15/864,860

(22) Filed: Jan. 8, 2018

(65) Prior Publication Data

US 2019/0212807 A1    Jul. 11, 2019

(51) Int. Cl.
*G06F 3/01* (2006.01)

(52) U.S. Cl.
CPC .............. *G06F 3/011* (2013.01); *G06F 3/017* (2013.01)

(58) Field of Classification Search
CPC ................................ G06F 3/011; A63F 13/211
See application file for complete search history.

(56) References Cited

U.S. PATENT DOCUMENTS

| | | | |
|---|---|---|---|
| 8,187,100 B1 | 5/2012 | Kahn et al. | |
| 8,933,886 B2 | 1/2015 | Imoto et al. | |
| 8,988,438 B2 | 3/2015 | Bang et al. | |
| 9,141,194 B1 | 9/2015 | Keyes et al. | |
| 9,278,453 B2 | 3/2016 | Assad | |
| 9,405,372 B2 | 8/2016 | Yen et al. | |
| D772,986 S | 11/2016 | Chen et al. | |

(Continued)

FOREIGN PATENT DOCUMENTS

| | | |
|---|---|---|
| CN | 103226398 | 7/2013 |
| WO | 2016183812 | 11/2016 |
| WO | 2016209819 | 12/2016 |

OTHER PUBLICATIONS

Title: Devices for Controlling Computers Based on Motions and Positions of Hands, U.S. Appl. No. 15/492,915, filed Apr. 20, 2017, Inventor(s): Viktor Erivantcev, et al, Status: Non Final Action dated Apr. 18, 2018.

(Continued)

*Primary Examiner* — Priyank J Shah
(74) *Attorney, Agent, or Firm* — Greenberg Traurig, LLP

(57) ABSTRACT

A system including a plurality sensor modules, each having an inertial measurement unit and attached to a portion of a user (e.g., upper arm, hand, and/or head) to measure the current orientation of the corresponding portion of the user. A computing device coupled to the sensor modules is configured to identify a type of the current pose of the user, compute a front facing direction of the torso of the user from the sensor measurements, select a torso leaning model based on the pose type, project onto a vertical plane the lengthwise directions of the arms of the user as tracked by the sensor modules attached to the upper arms of the user, and calculate a torso leaning angle from the projected lengthwise directions of the arms.

20 Claims, 10 Drawing Sheets

(56) References Cited

U.S. PATENT DOCUMENTS

| | | | |
|---|---|---|---|
| 9,504,414 | B2 | 11/2016 | Coza et al. |
| 9,600,925 | B2 | 3/2017 | Katz et al. |
| 9,891,718 | B2 | 2/2018 | Connor |
| 9,996,945 | B1 | 6/2018 | Holzer et al. |
| 10,019,806 | B2 | 7/2018 | Perry et al. |
| 2003/0142065 | A1 | 7/2003 | Pahlavan |
| 2007/0050597 | A1 | 3/2007 | Ikeda |
| 2007/0273610 | A1 | 11/2007 | Baillot |
| 2008/0088468 | A1 | 4/2008 | Kim |
| 2009/0322763 | A1* | 12/2009 | Bang .................. G06F 3/011 345/474 |
| 2010/0079466 | A1 | 4/2010 | Griffin |
| 2011/0161804 | A1 | 6/2011 | Park et al. |
| 2012/0025945 | A1 | 2/2012 | Yazadi et al. |
| 2012/0130203 | A1 | 5/2012 | Stergiou et al. |
| 2012/0214591 | A1 | 8/2012 | Ito et al. |
| 2012/0293410 | A1 | 11/2012 | Bell |
| 2014/0028547 | A1 | 1/2014 | Bromley et al. |
| 2014/0201689 | A1 | 7/2014 | Bedikian et al. |
| 2014/0313022 | A1 | 10/2014 | Moeller et al. |
| 2015/0062086 | A1 | 3/2015 | Nattukallingal |
| 2015/0077347 | A1 | 3/2015 | OGreen |
| 2015/0145860 | A1 | 5/2015 | Craig et al. |
| 2015/0145985 | A1 | 5/2015 | Gourlay et al. |
| 2015/0277559 | A1 | 10/2015 | Vescovi et al. |
| 2015/0358543 | A1 | 12/2015 | Kord |
| 2016/0005232 | A1* | 1/2016 | Quarles ............... G06T 19/006 345/633 |
| 2016/0054797 | A1 | 2/2016 | Tokubo et al. |
| 2016/0077608 | A1 | 3/2016 | Nakasu et al. |
| 2016/0187969 | A1 | 6/2016 | Larsen et al. |
| 2016/0306431 | A1 | 10/2016 | Stafford et al. |
| 2016/0313798 | A1 | 10/2016 | Connor |
| 2016/0378204 | A1 | 12/2016 | Chen et al. |
| 2017/0053454 | A1 | 2/2017 | Katz et al. |
| 2017/0083084 | A1* | 3/2017 | Tatsuta .................. G06F 3/147 |
| 2017/0115728 | A1 | 4/2017 | Park et al. |
| 2017/0308165 | A1* | 10/2017 | Erivantcev ........... A63F 13/211 |
| 2017/0352188 | A1 | 12/2017 | Levitt |
| 2018/0095637 | A1 | 4/2018 | Valdivia et al. |
| 2018/0101989 | A1 | 4/2018 | Frueh et al. |
| 2018/0165879 | A1 | 6/2018 | Holzer et al. |
| 2018/0217680 | A1 | 8/2018 | Sudou et al. |
| 2018/0225517 | A1 | 8/2018 | Holzer et al. |
| 2018/0253142 | A1 | 9/2018 | Tsuchie et al. |
| 2018/0313867 | A1* | 11/2018 | Erivantcev ............. G01P 21/00 |
| 2018/0335834 | A1* | 11/2018 | Erivantcev ............. G06F 3/012 |
| 2018/0335843 | A1 | 11/2018 | Erivantcev et al. |
| 2018/0335855 | A1* | 11/2018 | Erivantcev ........... A63F 13/235 |
| 2019/0187784 | A1* | 6/2019 | Erivantcev ............. G06F 3/012 |
| 2019/0212359 | A1 | 7/2019 | Erivantcev et al. |

OTHER PUBLICATIONS

Title: Tracking Arm Movements to Generate Inputs for Computer Systems, U.S. Appl. No. 15/787,555, filed Oct. 18, 2017, Inventor(s): Viktor Erivantcev, et al, Status: Docketed New Case—Ready for Examination, Status Date: Jan. 9, 2018.

Title: Calibration of Inertial Measurement Units Attached to Arms of a User and to a Head Mounted Device, U.S. Appl. No. 15/847,669, filed Dec. 19, 2017, Inventor(s): Viktor Erivantcev, et al, Status: Docketed New Case—Ready for Examination, Status Date: Feb. 2, 2018.

Forward kinematics, Wikipedia, printed on Sep. 21, 2017.

Title: Devices for Controlling Computers Based on Motions and Positions of Hands, U.S. Appl. No. 15/492,915, filed Apr. 20, 2017, Inventor(s): Viktor Erivantcev, et al, Status: Docketed New Case—Ready for Examination, Status Date: Nov. 16, 2018.

Title: Calibration of Inertial Measurement Units Attachted to Arms of a User and to a Head Mounted Device, U.S. Appl. No. 15/847,669, filed Dec. 19, 2017, Inventor(s): Viktor Erivantcev, et al, Status: Docketed New Case—Ready for Examination, Status Date: Feb. 2, 2018.

Title: Motion Predictions of Overlapping Kinematic Chains of a Skeleton Model Used to Control a Computer System, U.S. Appl. No. 15/996,389, filed Jun. 1, 2018, Inventor(s): Viktor Erivantcev, et al, Status: Docketed New Case—Ready for Examination, Status Date: Jul. 25, 2018.

Accessories for Vive, retrieved from https://www.vive.com/us/accessory/ on Jan. 30, 2017.

Daydream, retrieved from https://vr.google.com/daydream/ on Jan. 30, 2017.

Forward kinematics, Wikipedia, retrieved from https://en.wikipedia.org/wiki/Forward_kinematics on Sep. 21, 2017.

Gest—Work with your hands. Wayback Machine 2016. Retrieved from https://web.archive.org/web/20160304012247/https://gest.co/ on Jan. 30, 2017.

Gloveone: Feel Virtual Reality. Wayback Machine 2016. Retrieved from https://web.archive.org/web/20160307080001/https://www.gloveonevr.com/ on Jan. 30, 2017.

International Application No. PCT/US2017/028982, International Search Report and Written Opinion, dated Aug. 24, 2017.

Manus VR—The Pinnacle of Virtual Reality Controllers, Manus VR Development Kit Pro Q4 2016.

Manus VR—The virtual reality dataglove for consumers. Wayback Machine 2016. Retrieved from https://web.archive.org/web/20160417035626/https://manusvr. com/ on Jan. 30, 2017.

NeuroDigital: The VR Technology Factory, retrieved from https://www.neurodigital.es/ on Jan. 30, 2017.

Oculus Rift | Oculus. Retrieved from https://www3.oculus.com/enus/ rift/ on Jan. 30, 2017.

RevolVR Virtual Reality Controllers, retrieved from http://revolvr.co/ on Jan. 30, 2017.

Wireless Gaming Controllers for PC, Mac, and Mobile | SteelSeries, retrieved from https://steelseries.com/gamingcontrollers on Jan. 30, 2017.

Xbox Wireless Controller, retrieved from http://www.xbox.com/en-US/xbox-one/accessories/controllers/xbox-wireless-controller on Jan. 30, 2017.

Title: Devices for Controlling Computers Based on Motions and Positions of Hands, U.S. Appl. No. 15/492,915, filed Apr. 20, 2017, Inventor(s): Viktor Erivantcev, et al, Status: Response to Non-Final Office Action Entered and Forwarded to Examiner dated Apr. 11, 2019.

Title: Calibration of Inertial Measurement Units Attached to Arms of a User to Generate Inputs for Computer Systems, U.S. Appl. No. 15/817,646, filed Nov. 20, 2017, Inventor(s): Viktor Erivantcev, et al, Status: Docketed New Case—Ready for Examination, Status Date: Jan. 10, 2018.

Title: Tracking Arm Movements to Generate Inputs for Computer Systems, U.S. Appl. No. 15/787,555, filed Oct. 18, 2017, Inventor(s): Viktor Erivantcev, et al, Status: Non Final Action dated Nov. 9, 2018.

Title: Tracking Finger Movements to Generate Inputs for Computer Systems, U.S. Appl. No. 15/792,255, filed Oct. 24, 2017, Inventor(s): Viktor Erivantcev, et al, Status: Docketed New Case—Ready for Examination, Status Date: Jan. 9, 2018.

Title: Tracking Arm Movements to Generate Inputs for Computer Systems, U.S. Appl. No. 16/508,249, Inventor(s): Viktor Erivantcev, et al, Status: Application Undergoing Preexam Processing, Status Date: Jul. 10, 2019.

Title: Tracking Torso Orientation to Generate Inputs for Computer Systems, U.S. Appl. No. 15/813,813, filed Nov. 15, 2017, Inventor(s): Viktor Erivantcev, et al, Status: Docketed New Case—Ready for Examination, Status Date: Jan. 17, 2018.

Title: Calibration of Inertial Measurement Units Attached to Arms of a User and to a Head Mounted Device, U.S. Appl. No. 15/847,669, filed Dec. 19, 2017, Inventor(s): Viktor Erivantcev, et al, Status: Non Final Action dated Apr. 8, 2019.

Title: Correction of Accumulated Errors in Inertial Measurement Units Attached to a User, U.S. Appl. No. 15/868,745, filed Jan. 11, 2018, Inventor(s): Viktor Erivantcev, et al, Status: Docketed New Case—Ready for Examination, Status Date: Mar. 2, 2018.

Title: Tracking User Movements to Control a Skeleton Model in a Computer System, U.S. Appl. No. 15/973,137, filed May 7, 2018,

(56) References Cited

OTHER PUBLICATIONS

Inventor(s): Viktor Erivantcev, et al, Status: Docketed New Case—Ready for Examination, Status Date: Jul. 2, 2018.
Title: Motion Predictions of Overlapping Kinematic Chains of a Skeleton Model Used to Control a Computer System, U.S. Appl. No. 15/996,389, filed Jun. 1, 2018, Inventor(s): Viktor Erivantcev, et al, Status: Allowed—Notice of Allowance Not yet Mailed dated Apr. 10, 2019.
Title: Calibration of Measurement Units in Alignment with a Skeleton Model to Control a Computer System, U.S. Appl. No. 16/044,984, filed Jul. 25, 2018, Inventor(s): Viktor Erivantcev, et al, Status: Docketed New Case—Ready for Examination, Status Date: Aug. 27, 2018.

* cited by examiner

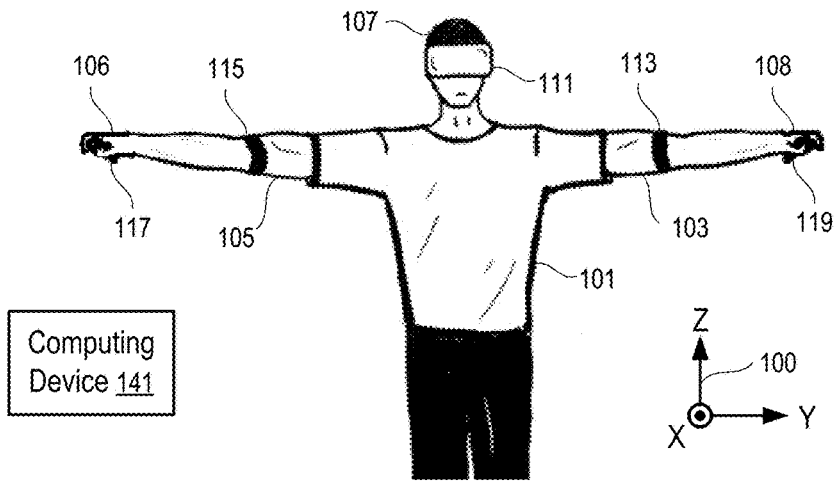
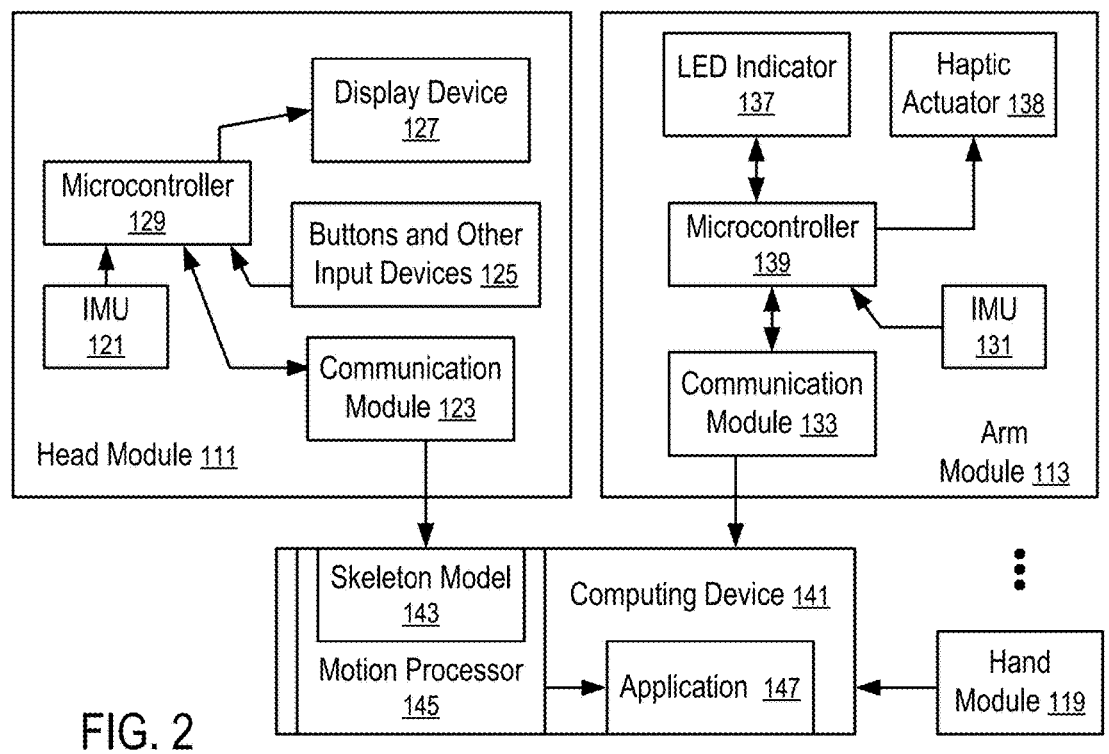
FIG. 1
FIG. 2

Receive motion data from two arm modules identifying orientations of the upper arms of a user 201

Receive motion data from a head module identifying an orientation of the head of the user 203

Calculate an orientation of the torso of the user from the orientations of the upper arms of the user and the orientation of the head of the user 205

TRACKING TORSO LEANING TO GENERATE INPUTS FOR COMPUTER SYSTEMS

RELATED APPLICATIONS

The present application relates to U.S. patent application Ser. No. 15/813,813, filed Nov. 15, 2017 and entitled "Tracking Torso Orientation to Generate Inputs for Computer Systems," U.S. patent application Ser. No. 15/792,255, filed Oct. 24, 2017 and entitled "Tracking Finger Movements to Generate Inputs for Computer Systems," U.S. patent application Ser. No. 15/787,555, filed Oct. 18, 2017 and entitled "Tracking Arm Movements to Generate Inputs for Computer Systems," and U.S. patent application Ser. No. 15/492,915, filed Apr. 20, 2017 and entitled "Devices for Controlling Computers based on Motions and Positions of Hands." The entire disclosures of the above-referenced related applications are hereby incorporated herein by reference.

FIELD OF THE TECHNOLOGY

The embodiments disclosed herein relate to computer input devices in general and more particularly but not limited to input devices for virtual reality and/or augmented/mixed reality applications implemented using computing devices, such as mobile phones, smart watches, similar mobile devices, and/or other devices.

BACKGROUND

U.S. Pat. App. Pub. No. 2014/0028547 discloses a user control device having a combined inertial sensor to detect the movements of the device for pointing and selecting within a real or virtual three-dimensional space.

U.S. Pat. App. Pub. No. 2015/0277559 discloses a finger-ring-mounted touchscreen having a wireless transceiver that wirelessly transmits commands generated from events on the touchscreen.

U. S. Pat. App. Pub. No. 2015/0358543 discloses a motion capture device that has a plurality of inertial measurement units to measure the motion parameters of fingers and a palm of a user.

U.S. Pat. App. Pub. No. 2007/0050597 discloses a game controller having an acceleration sensor and a gyro sensor. U.S. Pat. No. D772,986 discloses the ornamental design for a wireless game controller.

Chinese Pat. App. Pub. No. 103226398 discloses data gloves that use micro-inertial sensor network technologies, where each micro-inertial sensor is an attitude and heading reference system, having a tri-axial micro-electromechanical system (MEMS) micro-gyroscope, a tri-axial micro-acceleration sensor and a tri-axial geomagnetic sensor which are packaged in a circuit board. U.S. Pat. App. Pub. No. 2014/0313022 and U.S. Pat. App. Pub. No. 2012/0025945 disclose other data gloves.

The disclosures of the above discussed patent documents are hereby incorporated herein by reference.

BRIEF DESCRIPTION OF THE DRAWINGS

The embodiments are illustrated by way of example and not limitation in the figures of the accompanying drawings in which like references indicate similar elements.

FIG. 1 illustrates a system to track torso movements according to one embodiment.

FIG. 2 illustrates a system to control computer operations according to one embodiment.

DETAILED DESCRIPTION

Figures 3, 4:
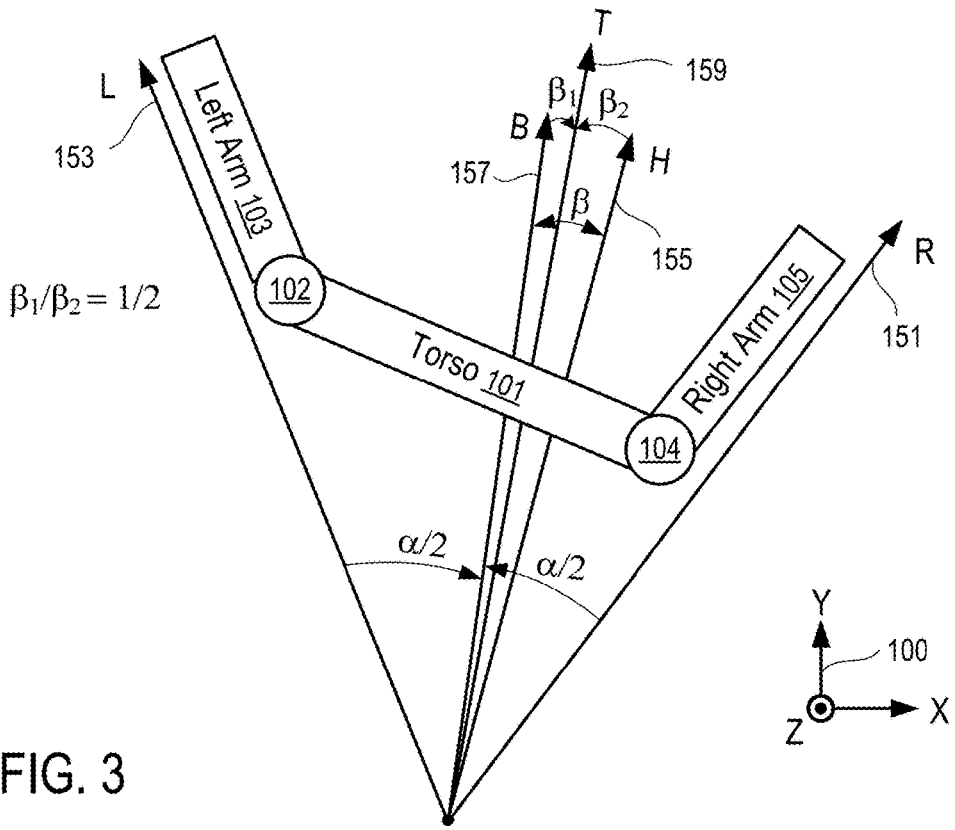
FIG. 3 illustrates a skeleton model and a method to determine the orientation of the torso of a user according to one embodiment.
FIG. 4 shows a method to compute the orientation of the torso of a user according to one embodiment.

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

At least some embodiments disclosed herein allow torso movement tracking without a sensor device attached to the torso of a user. The torso orientation is estimated, predicted, or computed from the orientations of the upper arms of the user and/or the orientation of the head of the user.

FIG. 1 illustrates a system to track torso movements according to one embodiment.

In FIG. 1, a user wears a number of sensor devices (111, 113, 115, 117 and 119) that track the orientations of portions of user that are movable relative to the torso (101) of the user and relative to each other, such as the head (107), the upper arms (103 and 105), and the hands (106 and 108).

The sensor devices (111-119) communicate their movement measurements to a computing device (141), which computes or estimates the orientation of the torso (101) from the orientations of the upper arms (103 and 105) and/or the orientation of the head (107) and thus eliminates the need to attach a separate sensor device to the torso (101).

In some implementations, each of the sensor devices (111-119) communicates its measurements directly to the computing device (141) in a way independent from the operations of other sensor devices.

Alternative, one of the sensor devices (111-119) may function as a base unit that receives measurements from one or more other sensor devices and transmit the bundled and/or combined measurements to the computing device (141).

Preferably, wireless connections made via a personal area wireless network (e.g., Bluetooth connections), or a local area wireless network (e.g., Wi-Fi connections) are used to facilitate the communication from the sensor devices (111-119) to the computing device (141).

Alternatively, wired connections can be are used to facilitate the communication among some of the sensor devices (111-119) and/or with the computing device (141).

For example, a hand module (117 or 119) attached to or held in a corresponding hand (106 or 108) of the user may receive the motion measurements of a corresponding arm module (115 or 113) and transmit the motion measurements of the corresponding hand (106 or 108) and the corresponding upper arm (105 or 103) to the computing device (141). Further, the hand module (e.g., 117) may combine its measurements with the measurements of the corresponding arm module (115) to compute the orientation of the forearm connected between the hand (106) and the upper arm (105), in a way as disclosed in U.S. patent application Ser. No. 15/787,555, filed Oct. 18, 2017 and entitled "Tracking Arm Movements to Generate Inputs for Computer Systems", the entire disclosure of which is hereby incorporated herein by reference.

For example, the hand modules (117 and 119) and the arm modules (115 and 113) can be each respectively implemented via a base unit (or a game controller) and an arm/shoulder module discussed in U.S. patent application Pub. Ser. No. 15/492,915, filed Apr. 20, 2017 and entitled "Devices for Controlling Computers based on Motions and Positions of Hands", the entire disclosure of which application is hereby incorporated herein by reference.

In some implementations, the head module (111) is configured as a base unit that receives the motion measurements from the hand modules (117 and 119) and the arm modules (115 and 113) and bundles the measurement data for transmission to the computing device (141). In some instances, the computing device (141) is implemented as part of the head module (111). The head module (111) may further determine the orientation of the torso (101) from the orientation of the arm modules (115 and 113) and/or the orientation of the head module (111), as further discussed below.

For the determination of the orientation of the torso (101), the hand modules (117 and 119) are optional in the system illustrated in FIG. 1.

Further, in some instances the head module (111) is not used, in the tracking of the orientation of the torso (101) of the user.

Typically, the measurements of the sensor devices (111-119) are calibrated for alignment with a common reference system, such as a coordinate system (100).

In FIG. 1, the coordinate system (100) is aligned with a number of directions relative to the user when the user is in a reference pose (e.g., illustrated in FIG. 1). In FIG. 1, the direction Z is parallel to the vertical direction from the feet of the user to the head (107) of the user; the direction Y is parallel to the sideway direction from one hand of the user to another hand of the user; and the direction X is parallel to the front-back direction relative to the user in the reference pose.

Subsequently, the hands, arms (105, 103), the head (107) and the torso (101) of the user may move relative to each other and relative to the coordinate system (100). The measurements of the sensor devices (111-119) provide orientations of the hands (106 and 108), the upper arms (105, 103), and the head (107) of the user relative to the coordinate system (100). The computing device (141) computes, estimates, or predicts the current orientation of the torso (101) from the current orientations of the arms (105, 103) and optionally, the current orientation the head (107) of the user, as further discussed below.

Optionally, the computing device (141) may further compute the orientations of the forearms from the orientations of the hands (106 and 108) and upper arms (105 and 103), e.g., using a technique disclosed in U.S. patent application Ser. No. 15/787,555, filed Oct. 18, 2017 and entitled "Tracking Arm Movements to Generate Inputs for Computer Systems", the entire disclosure of which is hereby incorporated herein by reference.

At least some embodiments disclosed herein allow the determination or estimation of the orientation of the torso (101) from the orientations of the upper arms (105 and 103) and if available, the orientation of the head (107) without the need for an additional sensor module being attached to the torso (101).

FIG. 2 illustrates a system to control computer operations according to one embodiment. For example, the system of FIG. 2 can be implemented via attaching the arm modules (115, 113) to the upper arms (105 and 103) respectively and optionally, the head module (111) to the head (107), in a way illustrated in FIG. 1.

In FIG. 2, the head module (111) and the arm module (113) have micro-electromechanical system (MEMS) inertial measurement units (IMUs) (121 and 131) that measure motion parameters and determine orientations of the head (107) and the upper arm (103). Similarly, the hand module (119) may also have its IMU.

Each of the IMUs (131, 121) has a collection of sensor components that enable the determination of the movement, position and/or orientation of the respective IMU along a number of axes. Examples of the components are: a MEMS accelerometer that measures the projection of acceleration (the difference between the true acceleration of an object and the gravitational acceleration); a MEMS gyroscope that measures angular velocities; and a magnetometer that measures the magnitude and direction of a magnetic field at a certain point in space. In some embodiments, the IMUs use a combination of sensors in three and two axes (e.g., without a magnetometer).

The computing device (141) has a motion processor (145), which includes a skeleton model (143) of the user (e.g., illustrated FIG. 3). The motion processor (145) controls the movements of the corresponding parts of the skeleton model (143) according to the movements/orientations of the upper arms (103 and 105) measured by the arm modules (113 and 115), the movements/orientation of the head (107) measured by the head module (111), the movements/orientations of the hand (106 and 108) measured by the hand modules (117 and 119), etc.

Since the torso (101) does not have a separately attached sensor module, the movements/orientation of the torso (101) is calculated/estimated/predicted from the orientation of the arm modules (113 and 115) and if available, the orientation of the head module (111), as discussed below in connection with FIGS. 3-5.

The skeleton model (143) is controlled by the motion processor (145) to generate inputs for an application (147) running in the computing device (141). For example, the skeleton model (143) can be used to control the movement of an avatar/model of the arms (105 and 103), the hands (106 and 108), the head (107), and the torso (101) of the user of the computing device (141) in a video game, a virtual reality, a mixed reality, or augmented reality, etc.

Preferably, the arm module (113) has a microcontroller (139) to process the sensor signals from the IMU (131) of the arm module (113) and a communication module (133) to transmit the motion/orientation parameters of the arm module (113) to the computing device (141). Similarly, the head module (111) has a microcontroller (129) to process the sensor signals from the IMU (121) of the head module (111) and a communication module (123) to transmit the motion/orientation parameters of the head module (111) to the computing device (141).

Optionally, the arm module (113) and the head module (111) have LED indicators (137 and 127) respectively to indicate the operating status of the modules (113 and 111).

Optionally, the arm module (113) has a haptic actuator (138) respectively to provide haptic feedback to the user.

Optionally, the head module (111) has a display device (127) and/or buttons and other input devices (125), such as a touch sensor, a microphone, a camera, etc.

In some implementations, the head module (111) is replaced with a module that is similar to the arm module (113) and that is attached to the head (107) via a strap or is secured to a head mount display device.

In some applications, the hand module (119) can be implemented with a module that is similar to the arm module (113) and attached to the hand via holding or via a strap. Optionally, the hand module (119) has buttons and other input devices, such as a touch sensor, a joystick, etc.

For example, the handheld modules disclosed in U.S. patent application Ser. No. 15/792,255, filed Oct. 24, 2017 and entitled "Tracking Finger Movements to Generate Inputs for Computer Systems", U.S. patent application Ser. No. 15/787,555, filed Oct. 18, 2017 and entitled "Tracking Arm Movements to Generate Inputs for Computer Systems", and/or U.S. patent application Ser. No. 15/492,915, filed Apr. 20, 2017 and entitled "Devices for Controlling Computers based on Motions and Positions of Hands" can be used to implement the hand modules (117 and 119), the entire disclosures of which applications are hereby incorporated herein by reference.

FIG. 2 shows a hand module (119) and an arm module (113) as examples. An application for the tracking of the orientation of the torso (101) typically uses two arm modules (113 and 115) as illustrated in FIG. 1. The head module (111) can be used optionally to further improve the tracking of the orientation of the torso (101). Hand modules (117 and 119) can be further used to provide additional inputs and/or for the prediction/calculation of the orientations of the forearms of the user.

Typically, an IMU (e.g., 131 or 121) in a module (e.g., 113 or 111) generates acceleration data from accelerometers, angular velocity data from gyrometers/gyroscopes, and/or orientation data from magnetometers. The microcontrollers (139 and 129) perform preprocessing tasks, such as filtering the sensor data (e.g., blocking sensors that are not used in a specific application), applying calibration data (e.g., to correct the average accumulated error computed by the computing device (141)), transforming motion/position/orientation data in three axes into a quaternion, and packaging the preprocessed results into data packets (e.g., using a data compression technique) for transmitting to the host computing device (141) with a reduced bandwidth requirement and/or communication time.

Each of the microcontrollers (129, 139) may include a memory storing instructions controlling the operations of the respective microcontroller (129 or 139) to perform primary processing of the sensor data from the IMU (121, 131) and control the operations of the communication module (123, 133), and/or other components, such as the LED indicator (137), the haptic actuator (138), buttons and other input devices (125), the display device (127), etc.

The computing device (141) may include one or more microprocessors and a memory storing instructions to implement the motion processor (145). The motion processor (145) may also be implemented via hardware, such as Application-Specific Integrated Circuit (ASIC) or Field-Programmable Gate Array (FPGA).

In some instances, one of the modules (111, 113, 115, 117, and/or 119) is configured as a primary input device; and the other module is configured as a secondary input device that is connected to the computing device (141) via the primary input device. A secondary input device may use the microprocessor of its connected primary input device to perform some of the preprocessing tasks. A module that communicates directly to the computing device (141) is consider a primary input device, even when the module does not have a secondary input device that is connected to the computing device via the primary input device.

In some instances, the computing device (141) specifies the types of input data requested, and the conditions and/or frequency of the input data; and the modules (111, 113, 115, 117, and/or 119) report the requested input data under the conditions and/or according to the frequency specified by the computing device (141). Different reporting frequencies can be specified for different types of input data (e.g., accelerometer measurements, gyroscope/gyrometer measurements, magnetometer measurements, position, orientation, velocity).

In general, the computing device (141) may be a data processing system, such as a mobile phone, a desktop computer, a laptop computer, a head mount virtual reality display, a personal medial player, a tablet computer, etc.

FIG. 3 illustrates a skeleton model and a method to determine the orientation of the torso of a user according to one embodiment. For example, the skeleton model of FIG. 3 can be used in the motion processor (145) of FIG. 2 to determine the orientation of the torso (101) that does not have an attached sensor module, as illustrated in FIG. 1.

The skeleton model illustrated in FIG. 3 includes a torso (101) and left and right arms (103 and 105) that can move relative to the torso (101) via the shoulder joints (102 and 104). The skeleton model may further include the forearms, hands (106 and 108), neck and/or head (107).

FIG. 3 illustrates the projection of the rotations of the arms (103) and the head (107) in the horizontal plane XY that is perpendicular to the vertical direction Z in the reference coordinate system (100).

For example, the directions L (153) and R (151) represent the lengthwise direction of the upper arms (103 and 105) as tracked/measured by the arm modules (113 and 115) and projected in the horizontal XY plane; and the direction H (155) represents the forward-facing direction of the head (107) as tracked/measured by the head module (111) and projected in the horizontal XY plane.

The directions L (153) and R (151) rotate relative to each other along the vertical axis Z in the horizontal XY plane to form an angle α. The direction B (157) bisects the angle α between the directions L (153) and R (151)

The direction B (157) and the direction H (155) form an angle β in the horizontal XY plane. The direction T (159) splits the angle β according to a predetermine ratio $β_1:β_2$ (e.g., 1:2).

Since the torso (101) does not have a sensor module that measures its orientation, the motion processor (145) estimates, calculates, or predicts the orientation of the torso (101) based on the directions L (153) and R (151) and if available, the direction H (155).

For example, when the head module (111) is not used and/or the direction H (155) is not available, the motion processor (145) computes the direction B (157) that bisects the directions L (153) and R (151) and uses the direction B (157) as the orientation of the torso (101).

For example, when the direction H (155) is available, the motion processor (145) computes the direction T (157) that splits, according to a predetermined ratio $β_2:β_1$ the angle β between the direction H (155) and the direction B (157) that in turn bisects the directions L (153) and R (151). The motion processor (145) uses the direction T (157) as the orientation of the torso (101).

In some instances, it is assumed that the torso (101) remains vertical and does not bend or lean forward, backward, and/or sideway. Thus, the orientation of the torso (101) can be determined from the direction B (157) and/or T (157).

FIG. 4 shows a method to compute the orientation of the torso of a user according to one embodiment. For example, the method of FIG. 4 can be implemented in a system illustrated in FIG. 2 with arm modules (113 and 115) and a head module (111) worn by a user in a way illustrated FIG. 1 and using the geometrical relations identified via FIG. 3.

In FIG. 4, a computing device (141): receives (201) motion data from two arm modules (113 and 115) identifying current orientations of the upper arms (103 and 105) of a user; receives (203) motion data from a head module (111) identifying a current orientation of the head (107) of the user; and calculates (205) a current orientation of the torso (101) of the user from the current orientations of the upper arms (103 and 105) of the user and the current orientation of the head (107) of the user.

The method of FIG. 4 eliminates the need for attaching a separate sensor device to the torso (101) of the user to measure and determine the orientation of the torso (101) of the user.

Figure 5:
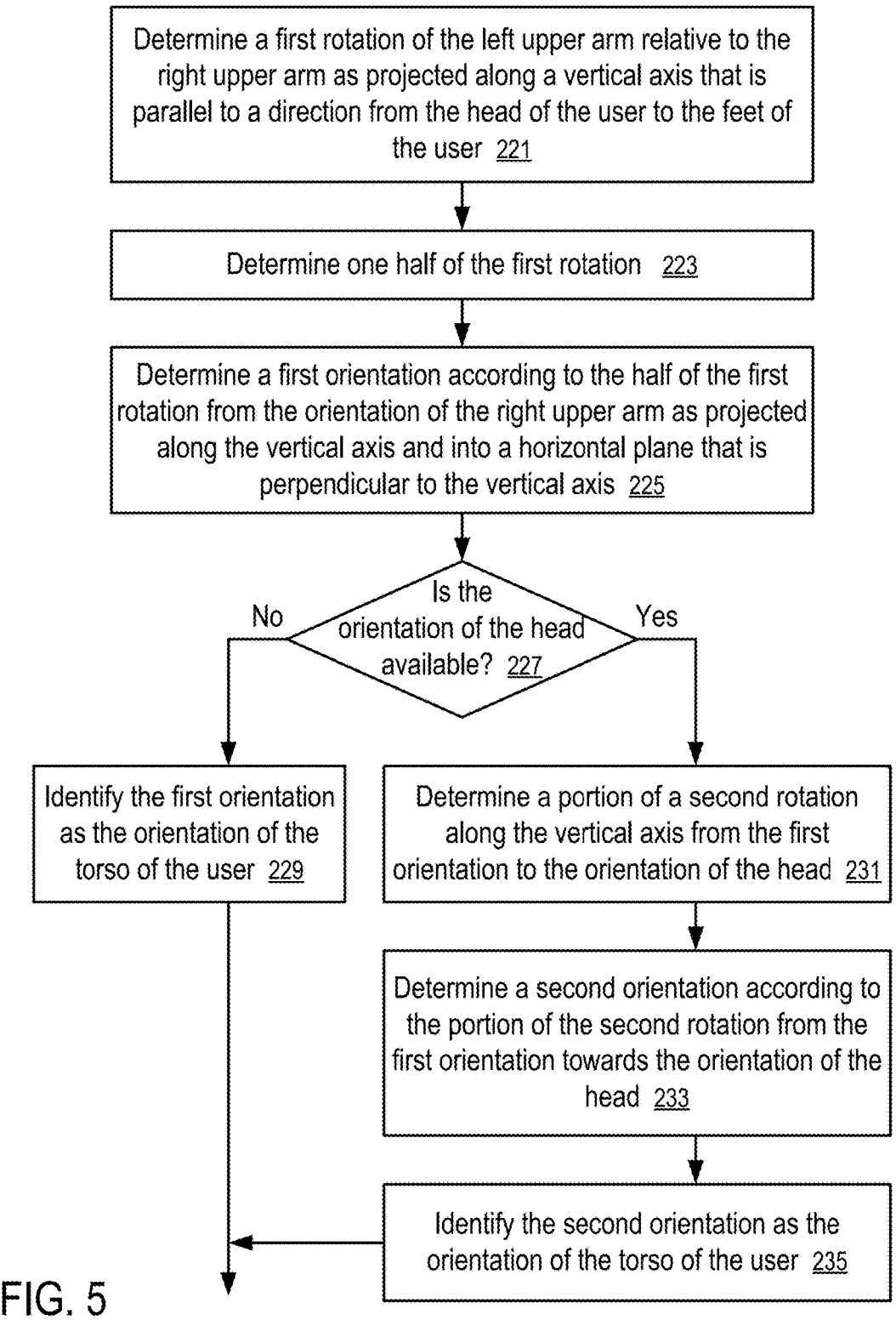
FIG. 5 shows a detailed method to compute the orientation of the torso of a user according to one embodiment.

FIG. 5 shows a detailed method to compute the orientation of the torso of a user according to one embodiment. For example, the method of FIG. 5 can be used to implement the calculation (205) of the orientation of the torso (101) in the method of FIG. 4.

In FIG. 5, the method includes: determining (221) a first rotation α of the left upper arm (103) relative to the right upper arm (105) as projected along a vertical axis Z that is parallel to a direction from the head (107) of the user to the feet of the user; determining (223) one half of the first rotation α; determining (225) a first orientation (157) according to the half of the first rotation α in the horizontal plane to the orientation of the right upper arm (105) (or from the orientation of the left upper arm (103)), as projected along the vertical axis Z and into a horizontal plane XY that is perpendicular to the vertical axis Z, towards the orientation of the left upper arm (103) (or from the orientation of the right upper arm (105)).

If it is determines (227) that the orientation of the head (107) is not available, the method further includes identify (229) the first orientation (157) as the orientation of the torso (101) of the user.

If it is determines (227) that the orientation of the head (107) is available, the method further includes: determining (231) a portion of a second rotation β along the vertical axis Z from the first orientation (157) to the orientation (155) of the head (107) as projected in the horizontal plane XY; determining (233) a second orientation (159) according to the portion of the second rotation from the first orientation (157) towards the orientation (155) of the head (107); and identifying (235) the second orientation (159) as the orientation of the torso (101) of the user.

As illustrated in FIG. 2, each of the arm modules (113 and 115) and the head module (111) is a sensor module that has an inertial measurement unit (IMU) (131, 121) for their orientation measurements. Preferably, the sensor module has a wireless communication device or module (133, 123) for a wireless communication link with the computing device (141). Alternatively, wired connections can be used. The inertial measurement unit (IMU) (131, or 121) of the sensor module (113, or 115) may include a micro-electromechanical system (MEMS) gyroscope, a magnetometer, and/or a MEMS accelerometer.

The method of FIG. 5 allows the calculation of the estimated/approximated orientation of the torso (101) without a need for a separate inertial measurement unit or sensor module attached to the torso (101) of the user, which arrangement reduces the cost of the system and improves user experiences.

Figure 6:
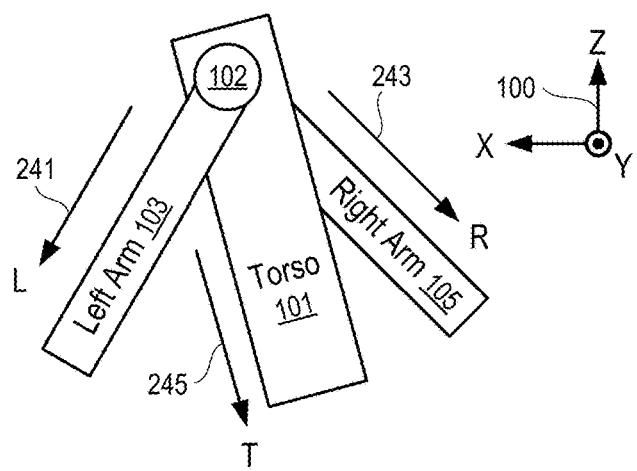
FIG. 6 illustrates a model to compute the forward leaning angle of the torso of a user according to one embodiment.

FIG. 6 illustrates a model to compute the forward leaning angle of the torso of a user according to one embodiment.

In FIG. 6, the tracking of the skeleton model of the user indicates that the user is in a leaning forward pose of reaching forward with one hand and pulling the other hand back, such as in the gesture of reaching an object positioned in front of the user. When in a pose of such a type, both of the arms (103 and 105) of the user point downward, with one arm (e.g., 103) pointing forward and downward and another arm (e.g., 105) pointing backward and downward. When in a pose of such a type, the torso (101) leans forward, regardless of whether the left arm (103) is in the front or the right arm (105) is in the front.

In FIG. 6, the lengthwise directions of the arms (103 and 105) and the torso (101) are projected in the vertical plane XZ that contains the front facing direction of the torso (101) and that is perpendicular to the sideway direction Y relative to the torso (101). In the coordinate system XYZ (100) illustrated in FIG. 6, the direction Z is parallel to the vertical direction; and the direction X is parallel to the horizontal direction. The coordinate system XYZ (100) can be identified in accordance with the front facing direction of the torso (101).

For example, after the front facing direction of the torso (101) is computed or estimated from the tracked/measured orientations of the arms (103 and 105) and/or the orientation of the head (107) (e.g., in a way as illustrated in and discussed with FIG. 3 using the techniques discussed above in connection with FIGS. 1 to 5), the projected lengthwise directions L (241) and R (243) of the arms (103 and 105) in the XZ plane as illustrated in FIG. 6 can be computed from the orientation measurements of the arm modules (113 and 115).

In the XZ plane illustrated in FIG. 6, the forward leaning angle of the torso (101) corresponds to an angle between the projected lengthwise direction T (245) of the torso (101) in the XZ plane and the vertical direction Z of the coordinate system (100).

In one embodiment, the forward leaning angle of the torso (101) is estimated as the larger one of: the angle between the vertical direction Z and the projected lengthwise direction of the forward and downward pointing arm (e.g., 103 illustrated in FIG. 6) in the XZ plane, and the angle between the vertical direction Z and the projected lengthwise direction of the backward and downward pointing arm (e.g., 105 illustrated in FIG. 6), as further discussed below in connection with FIGS. 7 and 8.

Figures 7, 8:
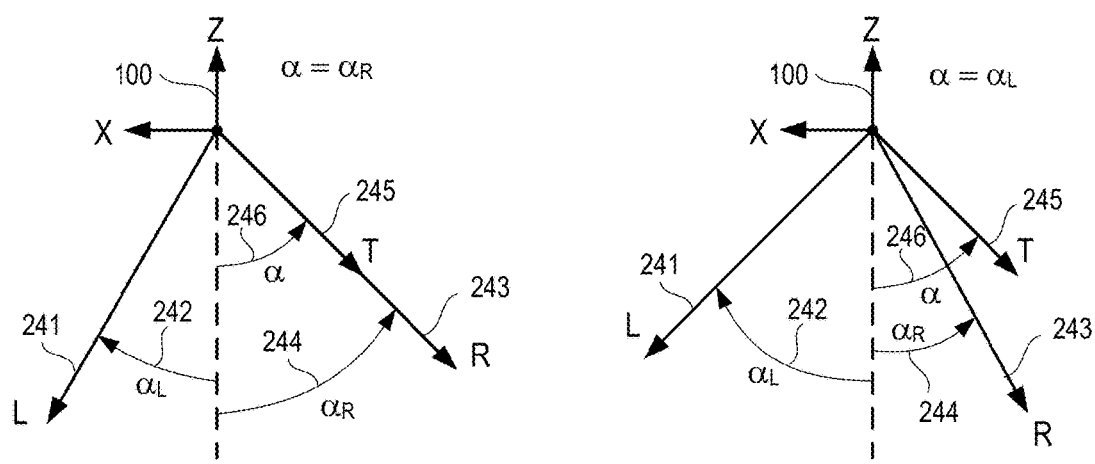
FIGS. 7 and 8 illustrate computations of the forward leaning angle of the torso of a user according to the model of FIG. 6.

FIGS. 7 and 8 illustrate computations of the forward leaning angle of the torso of a user according to the model of FIG. 6.

In FIGS. 7 and 8, the direction L (241) is the projection of the lengthwise direction of the forward and downward pointing arm (e.g., 103) in the XZ plane illustrated in FIG. 6; the direction R (241) is the projection of the lengthwise direction of the backward and downward pointing arm (e.g., 105) in the XZ plane; and the direction T (245) is the projection of the downward lengthwise direction of the torso (101) in the XZ plane. The front arm angle $\alpha_L$ (242) is between the direction L (241) and the downward vertical direction (–Z); the back arm angle $\alpha_R$ (244) is between the direction R (243) and the downward vertical direction (–Z); and the forward leaning angle $\alpha$ (246) of the torso (101) is the angle between the direction T (245) and the downward vertical direction (–Z).

FIG. 7 illustrates a situation where the front arm angle $\alpha_L$ (242) is smaller than the back arm angle $\alpha_R$ (244). In such a situation, the forward leaning angle $\alpha$ (246) of the torso (101) is estimated to be the same as the back arm angle $\alpha_R$ (244); and the direction T (245) and the direction R (243) are in parallel in the XZ plane.

FIG. 8 illustrates a situation where the front arm angle $\alpha_L$ (242) is larger than the back arm angle $\alpha_R$ (244). In such a situation, the forward leaning angle $\alpha$ (246) of the torso (101) is estimated to be the same as the front arm angle $\alpha_L$ (242); and the direction T (245) and the direction L (243) are symmetric with respect to the vertical axis Z in the XZ plane.

FIGS. 6, 7 and 8 illustrate a scenario where the left arm (103) is in the front and the right arm (105) is in the back, similar to the pose of reaching forward with the left hand of the user. The technique can also be similarly applied to a scenario where the left arm (103) is in the back and the right arm (105) is in the front, similar to the pose of reaching forward with the right hand of the user. When the user is determined to be neither in the pose illustrated in FIG. 6 with the left arm (103) in the front and the right arm (105) in the back, nor in a similar pose with the right arm (105) in the front and the left arm (103) in the back, the computations illustrated in FIGS. 7 and 8 are not applicable. For example, when the both arms (103 and 105) point forwards and downwards (or both backwards and downwards), the computations of FIGS. 7 and 8 are not applied.

Figure 9:
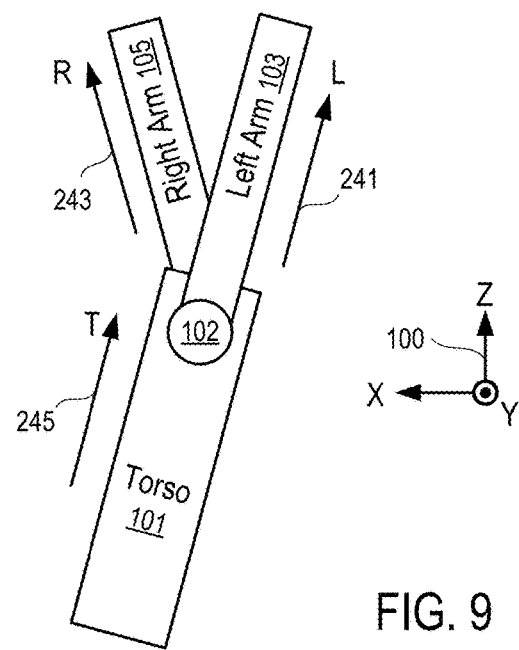
FIG. 9 illustrates a model to compute the backward leaning angle of the torso of a user according to one embodiment.

FIG. 9 illustrates a model to compute the backward leaning angle of the torso of a user according to one embodiment.

In FIG. 9, the tracking of the skeleton model of the user indicates that the user is in a leaning back pose of reaching up with at least one hand, such as in the gesture of reaching an object positioned above the head level of the user. When in a pose of such a type, at least one of the arms (103 and 105) of the user points generally upward and possibly backward; and the torso (101) leans backward.

In FIG. 9, the lengthwise directions of the arms (103 and 105) and the torso (101) are projected in the vertical plane XZ that contains the front facing direction of the torso (101) and that is perpendicular to the sideway direction Y relative to the torso (101). In the coordinate system XYZ (100) illustrated in FIG. 9, the direction Z is parallel to the vertical direction; and the direction X is parallel to the horizontal direction. The coordinate system XYZ (100) can be identified in accordance with the front facing direction of the torso (101).

For example, after the front facing direction of the torso (101) is computed or estimated from the tracked/measured orientations of the arms (103 and 105) and/or the orientation of the head (107) (e.g., in a way as illustrated in and discussed with FIG. 3 using the techniques discussed above in connection with FIGS. 1 to 5), the projected lengthwise directions L (241) and R (243) of the arms (103 and 105) in the XZ plane as illustrated in FIG. 9 can be computed from the orientation measurements of the arm modules (113 and 115).

In the XZ plane illustrated in FIG. 9, the backward leaning angle of the torso (101) corresponds to an angle between the projected lengthwise direction T (245) of the torso (101) in the XZ plane and the vertical direction Z of the coordinate system (100).

In one embodiment, the backward leaning angle of the torso (101) is estimated as the larger one of the angles of the projected lengthwise directions of the arms (103 and 105) rotated beyond a threshold direction above the horizontal direct X, as further discussed below in connection with FIGS. 10 and 11.

Figure 10:
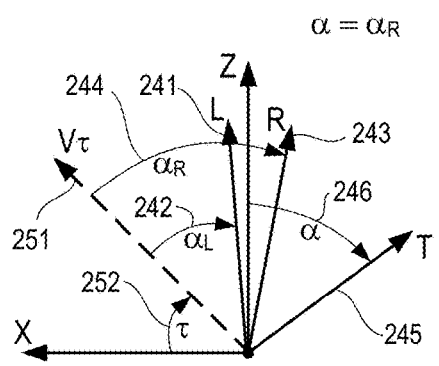
FIGS. 10 and 11 illustrate computations of the backward leaning angle of the torso of a user according to the model of FIG. 9.
Figure 11:
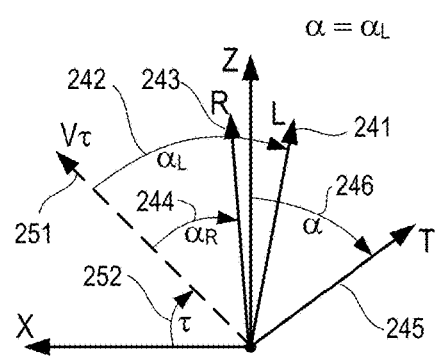

FIGS. 10 and 11 illustrate computations of the backward leaning angle of the torso of a user according to the model of FIG. 9.

In FIGS. 10 and 11, the direction L (241) is the projection of the lengthwise direction of the left arm (103) in the XZ plane illustrated in FIG. 9; the direction R (241) is the projection of the lengthwise direction of the right arm (105) in the XZ plane; and the direction T (245) is the projection of the upward lengthwise direction of the torso (101) in the XZ plane. The direction $V_\tau$ (251) is a predetermined threshold angle $\tau$ (252) above the forward, horizontal direction X. For example, the threshold angle $\tau$ (252) is 45 degrees above the direction X in the XZ plane.

In FIGS. 10 and 11, the left arm angle $\alpha_L$ (242) is the portion of the upward rotation of the direction L (241) above the threshold direction $V_\tau$ (251); the right arm angle $\alpha_R$ (244) is the portion of the upward rotation of the direction R (243) above the threshold direction $V_\tau$ (251); and the backward leaning angle $\alpha$ (246) of the torso (101) is the backward rotation from the vertical direction Z to the direction T (245). When the direction L (241) is below the threshold direction $V_\tau$ (251), the left arm angle $\alpha_L$ (242) is evaluated to be zero; and when the direction R (243) is below the threshold direction $V_\tau$ (251), the right arm angle $\alpha_R$ (244) is evaluated to be zero.

FIG. 10 illustrates a situation where the left arm angle $\alpha_L$ (242) is smaller than the right arm angle $\alpha_R$ (244). In such a situation, the backward leaning angle $\alpha$ (246) of the torso (101) is estimated to be equal to the right arm angle $\alpha_R$ (244).

FIG. 11 illustrates a situation where the left arm angle $\alpha_L$ (242) is larger than the right arm angle $\alpha_R$ (244). In such a situation, the backward leaning angle $\alpha$ (246) of the torso (101) is estimated to be equal to the left arm angle $\alpha_L$ (242).

When the user is determined to be not in the pose illustrated in FIG. 9, the computations of FIGS. 10 and 11 are not applicable. For example, when the both arms are below the threshold direction $V_\tau$ (251), the computations of FIGS. 10 and 11 are not applied.

Figure 12:
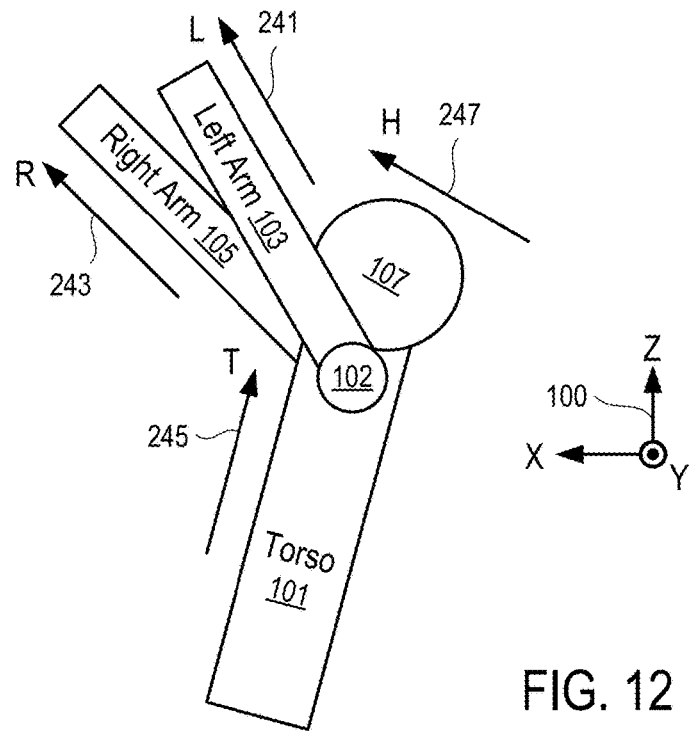
FIG. 12 illustrates another model to compute the backward leaning angle of the torso of a user according to one embodiment.

FIG. 12 illustrates another model to compute the backward leaning angle of the torso of a user according to one embodiment, where the front facing direction of the head (107) is measured via a head module (111).

Similar to FIG. 9, the model of FIG. 12 is used when the tracking of the skeleton model of the user indicates that the user is in a leaning back pose of reaching up with at least one hand, such as in the gesture of reaching an object positioned above the head level of the user. When in a pose of such a type, at least one of the arms (103 and 105) of the user points generally upward and possibly backward; and the torso (101) leans backward.

In FIG. 12, the lengthwise directions of the arms (103 and 105) and the torso (101) are projected in the vertical plane XZ that contains the front facing direction of the torso (101) and that is perpendicular to the sideway direction Y relative to the torso (101). In the coordinate system XYZ (100) illustrated in FIG. 12, the direction Z is parallel to the vertical direction; and the direction X is parallel to the horizontal direction. The coordinate system XYZ (100) can be identified in accordance with the front facing direction of the torso (101).

For example, after the front facing direction of the torso (101) is computed or estimated from the tracked/measured orientations of the arms (103 and 105) and/or the orientation of the head (107) (e.g., in a way as illustrated in and discussed with FIG. 3 using the techniques discussed above in connection with FIGS. 1 to 5), the projected lengthwise directions L (241) and R (243) of the arms (103 and 105) in the XZ plane as illustrated in FIG. 12 can be computed from the orientation measurements of the arm modules (113 and 115).

In the XZ plane illustrated in FIG. 12, the backward leaning angle of the torso (101) corresponds to an angle between the projected lengthwise direction T (245) of the torso (101) in the XZ plane and the vertical direction Z of the coordinate system (100).

In one embodiment, the backward leaning angle of the torso (101) is estimated as the smallest one of: the upward head rotation in the XZ plane, and the angles of the arms (103 and 105) rotated beyond a threshold direction above the horizontal direct X, as further discussed below in connection with FIG. 13.

Figure 13:
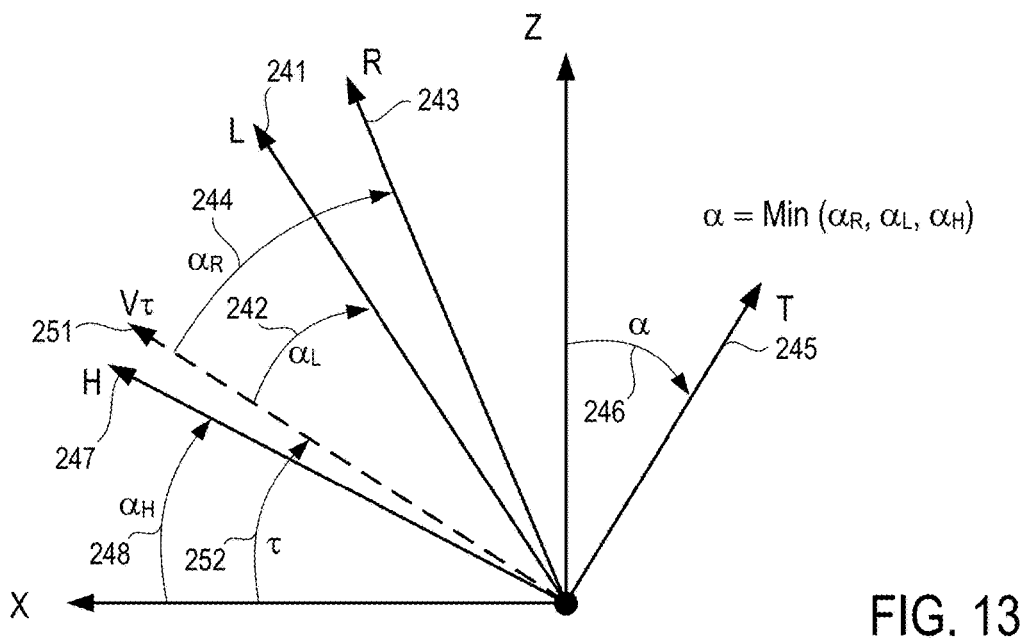
FIG. 13 illustrates the computation of the backward leaning angle of the torso of a user according to the model of FIG. 12.

FIG. 13 illustrates the computation of the backward leaning angle of the torso of a user according to the model of FIG. 12.

In FIG. 13, the direction L (241) is the projection of the lengthwise direction of the left arm (103) in the XZ plane illustrated in FIG. 12; the direction R (241) is the projection of the lengthwise direction of the right arm (105) in the XZ plane; the direction T (245) is the projection of the upward lengthwise direction of the torso (101) in the XZ plane; and the direction H (247) is the projection of the forward facing direction of the head (107) in the XZ plane. The direction $V_\tau$ (251) is a predetermined threshold angle $\tau$ (252) above the forward, horizontal direction X. For example, the threshold angle $\tau$ (252) is 30 degrees above the direction X in the XZ plane.

In FIG. 13, the left arm angle $\alpha_L$ (242) is the portion of the upward rotation of the direction L (241) above the threshold direction $V_\tau$ (251); the right arm angle $\alpha_R$ (244) is the portion of the upward rotation of the direction R (243) above the threshold direction $V_\tau$ (251); the head angle $\alpha_H$ (248) is the portion of the upward rotation of the direction H (247) above the horizontal direction X; and the backward leaning angle $\alpha$ (246) of the torso (101) is the backward rotation from the vertical direction Z to the direction T (245). When the direction L (241) is below the threshold direction $V_\tau$ (251), the left arm angle $\alpha_L$ (242) is evaluated to be zero; when the direction R (243) is below the threshold direction $V_\tau$ (251), the right arm angle $\alpha_R$ (244) is evaluated to be zero; and when the direction H (247) is below the horizontal direction X, the head angle $\alpha_H$ (248) is evaluated to be zero.

In FIG. 13, the backward leaning angle $\alpha$ (246) is estimated to be the same as the smallest one of: the left arm angle $\alpha_L$ (242), the right arm angle $\alpha_R$ (244), and the head angle $\alpha_H$ (248).

When the user is determined to be not in the pose illustrated in FIG. 12, the computations of FIG. 13 are not applicable. For example, when none of the arm directions L (241) and R (243) is above the threshold direction $V_\tau$ (251) and the head direction H (247) is below the horizontal direction X, the computations of FIG. 13 are not applied.

Figure 14:
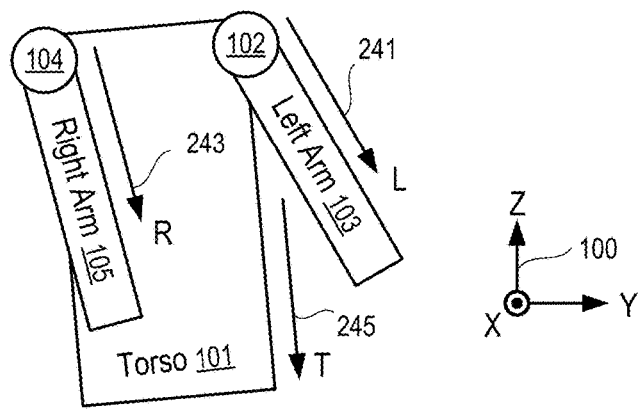
FIG. 14 illustrates a model to compute the sideway leaning angle of the torso of a user according to one embodiment.

FIG. 14 illustrates a model to compute the sideway leaning angle of the torso of a user according to one embodiment.

In FIG. 14, the tracking of the skeleton model of the user indicates that the user is in a sideway leaning pose where the arms (103 and 105) of the user are pointing downward and pointing sideway in the same side (e.g., both to the left side or both to the right side) and the hands of the user are twisted to face the front/back direction (e.g., away from the sideway directions). When in a pose of such a type, the torso (101) of the user is tilted sideway according to the difference between the sideway angles of the arms (103 and 105) and the level(s) of hand twisting away from the sideway directions.

In FIG. 14, the lengthwise directions of the arms (103 and 105) and the torso (101) are projected in the vertical plane YZ that contains the sideway direction Y of the torso (101) and that is perpendicular to the front, horizontal direction X relative to the torso (101). In the coordinate system XYZ (100) illustrated in FIG. 14, the direction Z is parallel to the vertical direction; and the direction X is parallel to the horizontal direction. The coordinate system XYZ (100) can be identified in accordance with the front facing direction of the torso (101).

For example, after the front facing direction of the torso (101) is computed or estimated from the tracked/measured orientations of the arms (103 and 105) and/or the orientation of the head (107) (e.g., in a way as illustrated in and discussed with FIG. 3 using the techniques discussed above in connection with FIGS. 1 to 5), the projected lengthwise directions L (241) and R (243) of the arms (103 and 105) in the YZ plane as illustrated in FIG. 14 can be computed from the orientation measurements of the arm modules (113 and 115). Further, the rotation/twist of the hands (106 and 108) of the user along their lengthwise directions can be computed from the orientation measurements of the hand modules (117 and 119), as further discussed below in connection with FIGS. 20 and 21.

In the YZ plane illustrated in FIG. 14, the sideway leaning angle of the torso (101) corresponds to an angle between the projected lengthwise direction T (245) of the torso (101) in the YZ plane and the vertical direction Z of the coordinate system (100).

In one embodiment, the sideway leaning angle of the torso (101) is estimated based on a difference between: the angle between the vertical direction Z and the projection of the lengthwise direction of the left arm (103) in the YZ plane, and the angle between the vertical direction Z and the projection of the lengthwise direction of the right arm (105) in the YZ plane, as further discussed below in connection with FIGS. 15 and 16.

Figure 15:
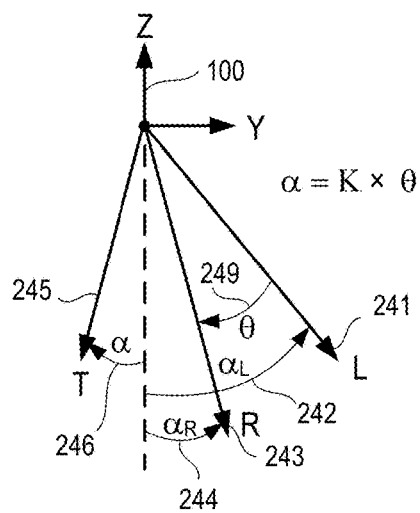
FIGS. 15 and 16 illustrate computations of the sideway leaning angle of the torso of a user according to the model of FIG. 14.
Figure 16:
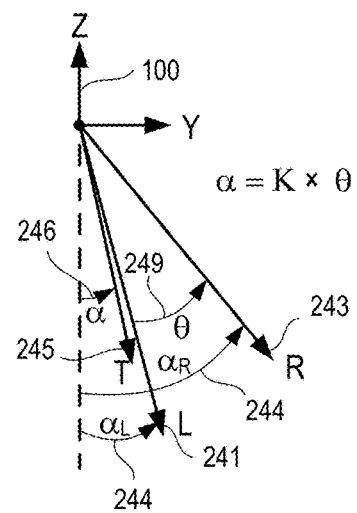

FIGS. 15 and 16 illustrate computations of the sideway leaning angle of the torso of a user according to the model of FIG. 14.

In FIGS. 15 and 16, the direction L (241) is the projection of the lengthwise direction of the left arm (e.g., 241) in the YZ plane illustrated in FIG. 14; the direction R (241) is the projection of the lengthwise direction of the right arm (105) in the YZ plane; and the direction T (245) is the projection of the downward lengthwise direction of the torso (101) in the YZ plane. The left arm sideway angle $\alpha_L$ (242) is between the direction L (241) and the downward vertical direction (−Z); the right arm sideway angle $\alpha_R$ (244) is between the direction R (243) and the downward vertical direction (−Z); and the torso sideway leaning angle $\alpha$ (246) of the torso (101) is the angle between the direction T (245) and the downward vertical direction (−Z).

In FIGS. 14, 15 and 16, both arms (103 and 105) point to the lower left side. The torso sideway leaning angle $\alpha$ (246) of the torso (101) is estimated to be proportional to the angle $\theta$ (249) from the direction L (241) to the direction R (243). The angle $\theta$ (249) can be computed from the difference between the left arm sideway angle $\alpha_L$ (242) and the right arm sideway angle $\alpha_R$ (244). When the direction L (241) moves to the right to reach the direction R (243) (e.g., $\alpha_L > \alpha_R$), the direction L (241) moves to the right from the downward vertical direction (−Z), as illustrated in FIG. 15. When the direction T (245) moves to the left to reach the direction R (243) (e.g., $\alpha_L < \alpha_R$), the direction T (245) moves to the left from the downward vertical direction (−Z), as illustrated in FIG. 16.

FIG. 15 illustrates a situation where the left arm sideway angle $\alpha_L$ (242) is larger than the right arm sideway angle $\alpha_R$ (244). In such a situation, the direction from L (241) to R (243) points to the right; and the downward torso lengthwise direction T (245) also points to the right. For example, the torso sideway leaning angle $\alpha$ (246) can be calculated as $\alpha = K_L \times \theta = K_L \times (\alpha_L - \alpha_R)$, where $K_L$ is a scaling factor determined based on the lengthwise rotation of the left hand (108).

FIG. 16 illustrates a situation where the left arm sideway angle $\alpha_L$ (242) is smaller than the right arm sideway angle $\alpha_R$ (244). In such a situation, the direction from L (241) to R (243) points to the left; and the downward torso lengthwise direction T (245) also points to the left. For example, the torso sideway leaning angle $\alpha$ (246) can be calculated as $\alpha = K_R \times \theta = K_R \times (\alpha_R - \alpha_L)$, where $K_R$ is a scaling factor determined based on the lengthwise rotation of the right hand (106).

Alternatively, the torso sideway leaning angle $\alpha$ (246) in FIGS. 15 and 16 can be calculated as the weighted difference $\alpha = K_L \times \alpha_L - K_R \times \alpha_R$, where $K_L$ and $K_R$ are scaling factors or weights determined based on the lengthwise rotations of the left and right hands (108 and 106). The downward torso lengthwise direction T (245) points to the right when $\alpha > 0$; and the downward torso lengthwise direction T (245) points to the left when $\alpha < 0$.

FIGS. 14, 15 and 16 illustrate a scenario where both arms (103 and 105) point to the lower left side. When both arms (103 and 105) point to the lower right side, the above discussed calculations for the torso sideway leaning angle $\alpha$ (246) of the torso (101) can be adjusted via mirroring from left to right and right to left. For example, when both arms (103 and 105) point to the lower right side in a leaning sideway pose, the angles $\alpha_L$ and $\alpha_R$ are measured to the right side of the torso (101); $\alpha = K \times \theta = K \times (\alpha_R - \alpha_L)$, where $K = K_R$ if $\alpha_R > \alpha_L$; $K = K_L$ if $\alpha_R < \alpha_L$; when $\alpha > 0$, the downward torso lengthwise direction T (245) points to the left; and when $\alpha < 0$, the downward torso lengthwise direction T (245) points to the right. Alternatively, the torso sideway leaning angle $\alpha$ (246) can be calculated as $\alpha = K_R \times \alpha_R - K_L \alpha_L$.

When the user is determined to be neither in the pose illustrated in FIG. 14 with the both arms (103 and 105) positioned toward the left side, nor in a similar pose with the both arms (103 and 105) positioned toward the right side, the computations of FIGS. 15 and 16 are not applicable. For example, when the one of the arms (103 and 105) points to the left and the other points to the right, the computations of FIGS. 15 and 16 are not applied.

Figure 17:
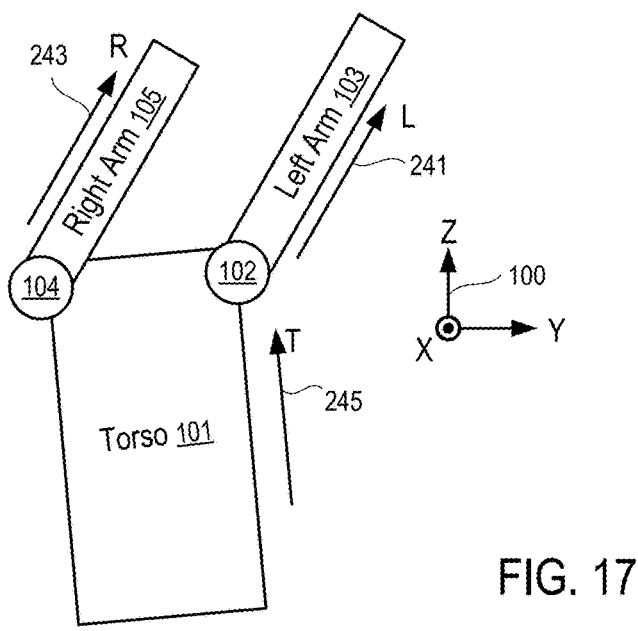
FIG. 17 illustrates another model to compute the sideway leaning angle of the torso of a user according to one embodiment.

FIG. 17 illustrates another model to compute the sideway leaning angle of the torso of a user according to one embodiment.

In FIG. 17, the tracking of the skeleton model of the user indicates that the user is in a sideway leaning pose where the arms (103 and 105) of the user are pointing upward and pointing sideway in the same side (e.g., both to the left side or both to the right side) and the hands of the user are twisted to face the front/back direction (e.g., away from the sideway directions). When in a pose of such a type, the torso (101) of the user is tilted sideway according to the difference between the sideway angles of the arms (103 and 105) and the level(s) of hand twisting away from the sideway directions.

In FIG. 17, the lengthwise directions of the arms (103 and 105) and the torso (101) are projected in the vertical plane YZ that contains the sideway direction Y of the torso (101) and that is perpendicular to the front, horizontal direction X relative to the torso (101). In the coordinate system XYZ (100) illustrated in FIG. 17, the direction Z is parallel to the vertical direction; and the direction X is parallel to the horizontal direction. The coordinate system XYZ (100) can be identified in accordance with the front facing direction of the torso (101).

For example, after the front facing direction of the torso (101) is computed or estimated from the tracked/measured orientations of the arms (103 and 105) and/or the orientation of the head (107) (e.g., in a way as illustrated in and discussed with FIG. 3 using the techniques discussed above in connection with FIGS. 1 to 5), the projected lengthwise directions L (241) and R (243) of the arms (103 and 105) in the YZ plane as illustrated in FIG. 17 can be computed from the orientation measurements of the arm modules (113 and 115). Further, the rotation/twist of the hands (106 and 108) of the user along their lengthwise directions can be computed from the orientation measurements of the hand modules (117 and 119), as further discussed below in connection with FIGS. 20 and 21.

In the YZ plane illustrated in FIG. 17, the sideway leaning angle of the torso (101) corresponds to an angle between the projected lengthwise direction T (245) of the torso (101) in the YZ plane and the vertical direction Z of the coordinate system (100).

Figure 18:
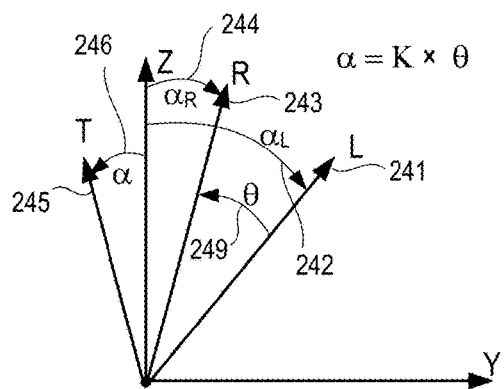
FIGS. 18 and 19 illustrate computations of the sideway leaning angle of the torso of a user according to the model of FIG. 17.
Figure 19:
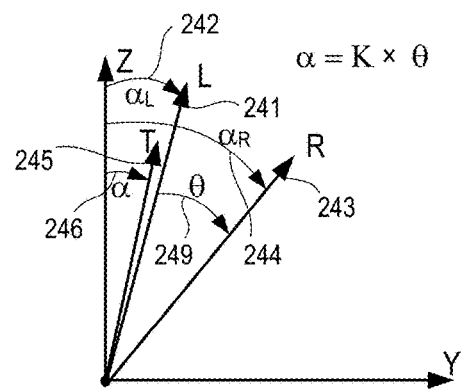

In one embodiment, the sideway leaning angle of the torso (101) is estimated based on a difference between: the angle between the vertical direction Z and the projection of the lengthwise direction of the left arm (103) in the YZ plane, and the angle between the vertical direction Z and the projection of the lengthwise direction of the right arm (105) in the YZ plane, as illustrated in FIGS. 18 and 19.

FIGS. 18 and 19 illustrate computations of the sideway leaning angle of the torso of a user according to the model of FIG. 17.

In FIGS. 18 and 19, the direction L (241) is the projection of the lengthwise direction of the left arm (e.g., 241) in the YZ plane illustrated in FIG. 17; the direction R (241) is the projection of the lengthwise direction of the right arm (105) in the YZ plane; and the direction T (245) is the projection of the upward lengthwise direction of the torso (101) in the YZ plane. The left arm sideway angle $\alpha_L$ (242) is between the direction L (241) and the upward vertical direction Z; the right arm sideway angle $\alpha_R$ (244) is between the direction R (243) and the upward vertical direction Z; and the torso sideway leaning angle $\alpha$ (246) of the torso (101) is the angle between the direction T (245) and the upward vertical direction Z.

In FIGS. 17, 18 and 19, both arms (103 and 105) point to the upper left side. The torso sideway leaning angle $\alpha$ (246) of the torso (101) is estimated to be proportional to the angle $\theta$ (249) from the direction L (241) to the direction R (243). The angle $\theta$ (249) can be computed from the difference between the left arm sideway angle $\alpha_L$ (242) and the right arm sideway angle $\alpha_R$ (244). When the direction L (241) moves to the right to reach the direction R (243) (e.g., $\alpha_L > \alpha_R$), the direction T (245) moves to the right from the upward vertical direction Z, as illustrated in FIG. 18. When the direction L (241) moves to the left to reach the direction R (243) (e.g., $\alpha_L < \alpha_R$), the direction T (245) moves to the left from the upward vertical direction Z, as illustrated in FIG. 19.

FIG. 18 illustrates a situation where the left arm sideway angle $\alpha_L$ (242) is larger than the right arm sideway angle $\alpha_R$ (244). In such a situation, the direction from L (241) to R (243) point to the right; and the upward torso lengthwise direction T (245) also points to the right. For example, the torso sideway leaning angle $\alpha$ (246) can be calculated as $\alpha = K_L \times \theta = K_L \times (\alpha_L - \alpha_R)$, where $K_L$ is a scaling factor determined based on the lengthwise rotation of the left hand (108).

FIG. 19 illustrates a situation where the left arm sideway angle $\alpha_L$ (242) is smaller than the right arm sideway angle $\alpha_R$ (244). In such a situation, the direction from L (241) to R (243) points to the left; and the upward torso lengthwise direction T (245) also points to the left. For example, the torso sideway leaning angle $\alpha$ (246) can be calculated as $\alpha = K_R \times \theta = K_R \times (\alpha_R - \alpha_L)$, where $K_R$ is a scaling factor determined based on the lengthwise rotation of the right hand (106).

Alternatively, the torso sideway leaning angle $\alpha$ (246) in FIGS. 18 and 19 can be calculated as the weighted difference $\alpha = K_L \times \alpha_L - K_R \times \alpha_R$, where $K_L$ and $K_R$ are scaling factors or weights determined based on the lengthwise rotation of the left and right hands (108 and 106). The upward torso lengthwise direction T (245) points to the right when $\alpha > 0$; and the upward torso lengthwise direction T (245) points to the left when $\alpha < 0$.

FIGS. 17, 18 and 19 illustrate a scenario where both arms (103 and 105) point to the upper left side. When both arms (103 and 105) point to the upper right side, the above discussed calculations for the torso sideway leaning angle $\alpha$ (246) of the torso (101) can be adjusted via mirroring from left to right and right to left. For example, when both arms (103 and 105) point to the upper right side in a leaning sideway pose, the angles $\alpha_L$ and $\alpha_R$ are measured to the right side of the torso (101); $\alpha = K \times \theta = K \times (\alpha_R - \alpha_L)$, where $K = K_R$ if $\alpha_R > \alpha_L$; $K = K_L$ if $\alpha_R < \alpha_L$; when $\alpha > 0$, the upward torso lengthwise direction T (245) points to the left; and when $\alpha < 0$, the upward torso lengthwise direction T (245) points to the right. Alternatively, the torso sideway leaning angle $\alpha$ (246) can be calculated as $\alpha = K_R \times \alpha_R - K_L \times \alpha_L$.

When the user is determined to be neither in the pose illustrated in FIG. 17 with the both arms (103 and 105) positioned toward the left side, nor in a similar pose with the both arms (103 and 105) positioned toward the right side, the computations of FIGS. 18 and 19 are not applicable. For example, when the one of the arms (103 and 105) points to the left and the other points to the right, the computations of FIGS. 18 and 19 are not applied.

In some instances, when the user is in a pose that matches the model of FIG. 17 for leaning sideway and the model of FIG. 9 or 12 for leaning backward, the sideway and back leaning angles can be computed separated for the torso (101) using the respective models.

Figure 20:
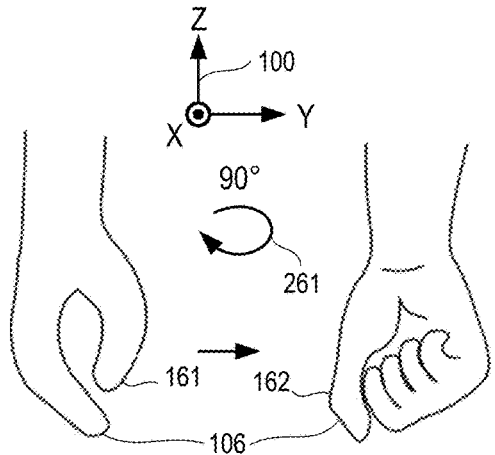
FIGS. 20 and 21 illustrate the identification of the rotations of hands for the calculation of a scaling coefficient in the computation of the sideway leaning angle of the torso of a user according to one embodiment.
Figure 21:
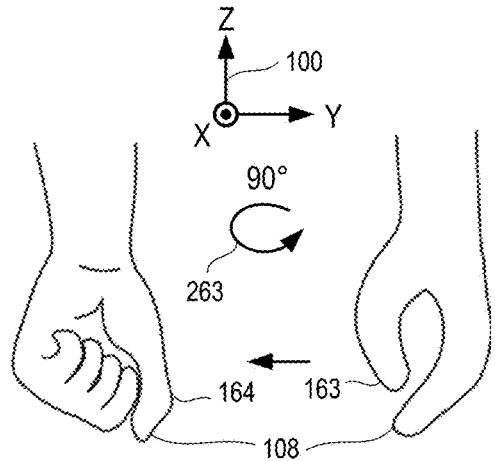

FIGS. 20 and 21 illustrate the identification of rotations of hands for the calculation of a scaling coefficient in the computation of the sideway leaning angle of the torso of a user according to one embodiment.

FIG. 20 illustrates the rotation (261) of the right hand (106) of the user, along its lengthwise direction from an orientation (161) with the fingers pointing down (e.g., the opposite of the vertical direction Z) and the palm facing toward the body/torso (101) of the user (e.g., facing the direction Y), to an orientation (162) with the fingers pointing down and the palm facing the front (e.g., the direction X).

The rotation (e.g., 261) of the right hand (106) along its lengthwise direction can be calculated from the current orientation of the right hand (106) by rotating the lengthwise direction of the right hand (106) at the orientation (161) according to the rotation transformation of the current orientation of the right hand (106) to the current lengthwise direction of the right hand (106), determining the nearest arc rotation from the current lengthwise direction of the right hand (106) to the lengthwise direction of the right hand (106) at the orientation (161), and applying the nearest arc rotation to the rotation transformation of the current orientation of the right hand (106) to obtain the rotation $\gamma_R$ along the lengthwise direction of the right hand (106). The angle of the rotation $\gamma_R$ is determined in such a way that when the right hand (106) is in the orientation (161), the rotation $\gamma_R$ is zero, and when the right hand (106) is in the orientation (162), the rotation $\gamma_R$ is 90 degrees. The rotation $\gamma_R$ can be scaled (e.g., by 90 degrees) to obtain the coefficient $K_R$ discussed above such that when the right hand (106) is in the orientation (161), the coefficient $K_R$ is zero, and when the right hand (106) is in the orientation (162), the coefficient $K_R$ is 1.

FIG. 21 illustrates the rotation (263) of the left hand (106) of the user, along its lengthwise direction from an orientation (163) with the fingers pointing down (e.g., the opposite of direction Z) and the palm facing toward the body/torso (101) of the user (e.g., facing the opposite of direction Y), to an orientation (164) with the fingers pointing down and the palm facing the front (e.g., the direction X).

The rotation (263) of the left hand (106) along its lengthwise direction can be calculated from the current orientation of the left hand (106) by rotating the lengthwise direction of the left hand (106) at the orientation (163) according to the rotation transformation of the current orientation of the left hand (106) to the current lengthwise direction of the left hand (106), determining the nearest arc rotation from the current lengthwise direction of the left hand (106) to the lengthwise direction of the left hand (106) at the orientation (163), and applying the nearest arc rotation to the rotation transformation of the current orientation of the left hand (106) to obtain the rotation along the lengthwise direction of the left hand (106). The angle of the rotation is determined in such a way that when the left hand (106) is in the orientation (163), the rotation is zero, and when the left hand (106) is in the orientation (164), the rotation is 90 degrees. The rotation can be scaled (e.g., by 90 degrees) to obtain the coefficient $K_L$ discussed above such that when the left hand (106) is in the orientation (163), the coefficient $K_L$ is zero, and when the left hand (106) is in the orientation (164), the coefficient $K_L$ is 1.

Figure 22:
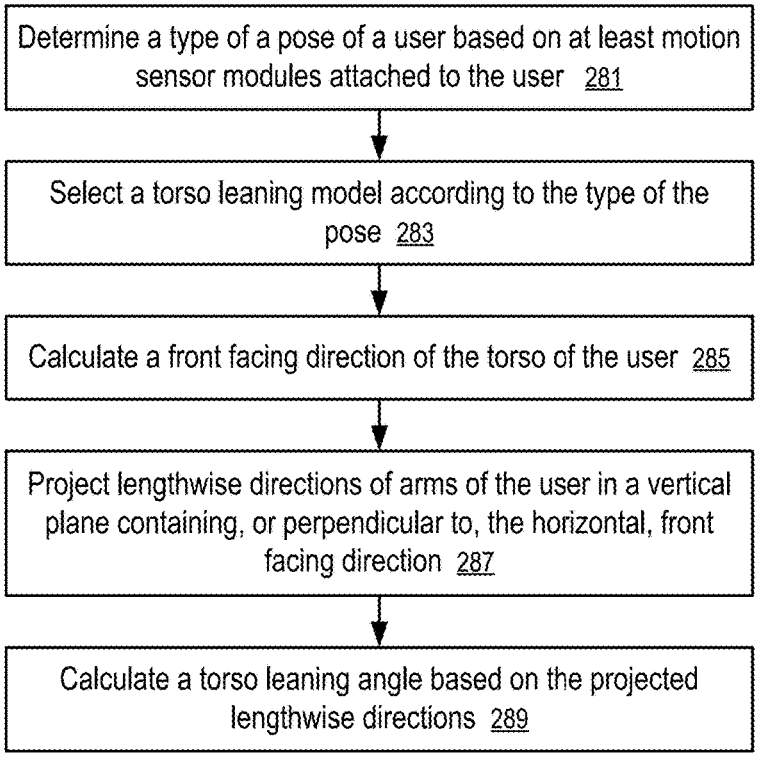
FIGS. 22 and 23 show methods to determine a torso leaning angle according to some embodiments.

FIG. 22 shows a method to determine a torso leaning angle according to one embodiment. For example, the method of FIG. 22 can be implemented in the system of FIG. 2 with sensor models (111 to 119) attached to upper arms (103 and 105), hands (106 and 108), and the head (107) of the user in a way illustrated in FIG. 1 using the models of calculations illustrated in FIGS. 3 and 6-21.

The method of FIG. 22 includes determining (281) a type of a pose of a user based on at least motion sensor modules attached to the user (e.g., as illustrated in FIG. 1). For example, the current pose of the user as tracked by the arm modules (113 and 115), the hand modules (117 and 119), and/or the head module (111) can be classified into one of multiple post types (e.g., based on gesture recognition). Each of the post types has an associated model (e.g., as illustrated in FIGS. 6, 9, 12, 14, and 17) for the computations (e.g., as illustrated in FIGS. 7-8, 10-11, 13, 15-16, and 18-19).

The method of FIG. 22 further includes: selecting (283) a torso leaning model (e.g., as illustrated in FIGS. 6, 9, 12, 14, and 17) according to the type of the pose; calculating (285) a front facing direction of the torso of the user (e.g., using the method of FIG. 4 or 5 using the computation illustrated in FIG. 3); projecting (287) lengthwise directions of arms of the user in a vertical plane containing, or perpendicular to, the horizontal, front facing direction (e.g., plan XZ or YZ illustrated in FIGS. 6, 9, 12, 14, and 17); and calculating (289) a torso leaning angle (e.g., a illustrated in FIGS. 7-8, 10-11, 13, 15-16, and 18-19) based on the projected lengthwise directions (e.g., directions L (241) and R (243) illustrated in FIGS. 6, 9, 12, 14, and 17).

Figure 23:
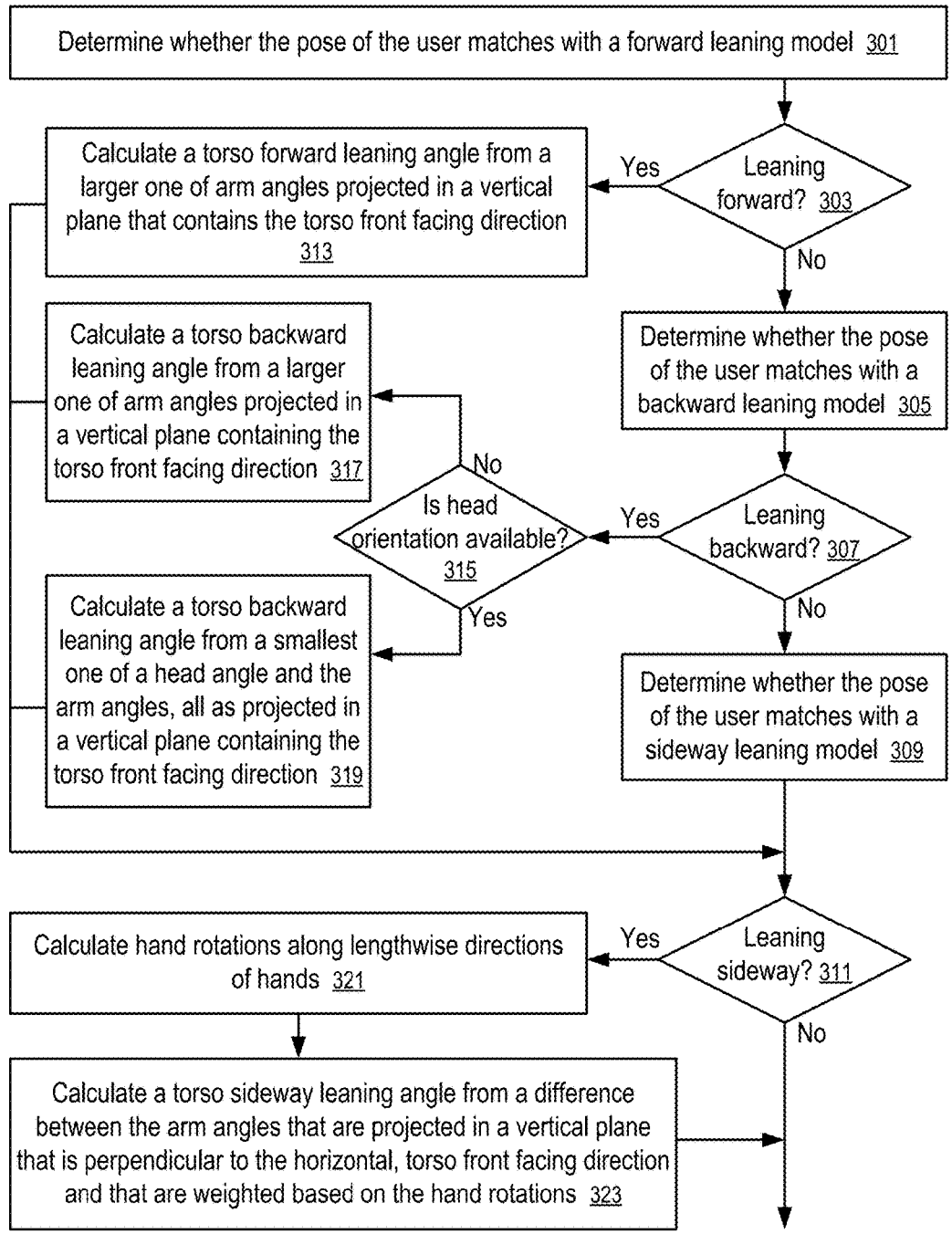

FIG. 23 shows a detailed method to determine a torso leaning angle according to one embodiment. For example, the method of FIG. 23 can be implemented in the system of FIG. 2 with sensor models (111 to 119) attached to upper arms (103 and 105), hands (106 and 108), and the head (107) of the user in a way illustrated in FIG. 1 using the models of calculations illustrated in FIGS. 3 and 6-21.

The method of FIG. 23 includes determining (301) whether the pose of the user matches with a forward leaning model (e.g., as illustrated in FIG. 6); and if (303) so, calculating (313) a torso forward leaning angle (e.g., a illustrated in FIGS. 7-8) from a larger one of arm angles (e.g., $\alpha_L$ (221) and $\alpha_R$ (224) illustrated in FIGS. 7-8) projected in a vertical plane (e.g., plane XZ) that contains the torso front facing direction (e.g., X illustrated in FIG. 6).

The method of FIG. 23 includes determine (305) whether the pose of the user matches with a backward leaning model (e.g., as illustrated in FIGS. 9 and 12); and if (307) so, it is determined (315) whether the head orientation available (e.g., for a head module (111)).

If (315) it is determined that the head orientation of the user is not available, the method of FIG. 23 further includes calculating (317) a torso backward leaning angle (e.g., a illustrated in FIGS. 10-11) from a larger one of arm angles (e.g., $\alpha_L$ (221) and $\alpha_R$ (224) illustrated in FIGS. 10-11) projected in a vertical plane (e.g., plane XZ) containing the torso front facing direction (e.g., X illustrated in FIG. 9).

If (315) it is determined that the head orientation of the user is available, the method of FIG. 23 further includes calculating (319) a torso backward leaning angle from a smallest one of a head angle (e.g., $\alpha_H$ illustrated in FIG. 13) and the arm angles (e.g., $\alpha_L$ (221) and $\alpha_R$ (224) illustrated in FIG. 13), all as projected in a vertical plane (e.g., plane XZ) containing the torso front facing direction (e.g., X illustrated in FIG. 12).

The method of FIG. 23 includes determine (309) whether the pose of the user matches with a sideway leaning model (e.g., as illustrated in FIGS. 14 and 17); and if (311) so, calculating (321) hand rotations (e.g., $\gamma_R$ and discussed above in connection with FIGS. 20 and 21) along lengthwise directions of hands (106 and 108) and calculating (323) a torso sideway leaning angle (e.g., a (246) illustrated in FIGS. 15-16 and 18-19) from a difference (e.g., θ (249) illustrated in FIGS. 15-16 and 18-19)) between the arm angles (e.g., $\alpha_L$ (221) and $\alpha_R$ (224) illustrated in FIGS. 15-16 and 18-19) that are projected in a vertical plane (e.g., plane YZ) that is perpendicular to the horizontal, torso front facing direction (e.g., direction X illustrated in FIGS. 14 and 17) and that are weighted (e.g., $K_R$ and/or $K_L$) based on the hand rotations (e.g., $\gamma_R$ and/or $\gamma_L$).

The present disclosure includes methods and apparatuses which perform these methods, including data processing systems which perform these methods, and computer readable media containing instructions which when executed on data processing systems cause the systems to perform these methods.

For example, the computing device (141), the arm modules (113, 115) and/or the head module (111) can be implemented using one or more data processing systems.

A typical data processing system may include includes an inter-connect (e.g., bus and system core logic), which interconnects a microprocessor(s) and memory. The microprocessor is typically coupled to cache memory.

The inter-connect interconnects the microprocessor(s) and the memory together and also interconnects them to input/output (I/O) device(s) via I/O controller(s). I/O devices may include a display device and/or peripheral devices, such as mice, keyboards, modems, network interfaces, printers, scanners, video cameras and other devices known in the art. In one embodiment, when the data processing system is a server system, some of the I/O devices, such as printers, scanners, mice, and/or keyboards, are optional.

The inter-connect can include one or more buses connected to one another through various bridges, controllers and/or adapters. In one embodiment the I/O controllers include a USB (Universal Serial Bus) adapter for controlling USB peripherals, and/or an IEEE-1394 bus adapter for controlling IEEE-1394 peripherals.

The memory may include one or more of: ROM (Read Only Memory), volatile RAM (Random Access Memory), and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In the present disclosure, some functions and operations are described as being performed by or caused by software code to simplify description. However, such expressions are also used to specify that the functions result from execution of the code/instructions by a processor, such as a microprocessor.

Alternatively, or in combination, the functions and operations as described here can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While one embodiment can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to non-transitory, recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROM), Digital Versatile Disks (DVDs), etc.), among others. The computer-readable media may store the instructions.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A system, comprising:
   a plurality of sensor modules, each having an inertial measurement unit and attached to a portion of the user to generate motion data identifying an orientation of the portion of the user, wherein the plurality of sensor modules includes at least a first sensor module attached to a left upper arm of the user and a second sensor module attached to a right upper arm of the user; and
   a computing device coupled to the plurality of sensor modules and configured to:
   calculate a horizontal, front facing direction of a torso of the user;
   identify a type of a current pose of the user based at least in part on the sensor modules;
   select a torso leaning model according to the type;
   project lengthwise directions of upper arms of the user in a vertical plane that contains the front facing direction or is perpendicular to the front facing direction; and
   calculate a leaning angle of the torso based on the projected lengthwise directions according to the selected torso leaning model.

2. The system of claim 1, wherein the leaning angle of the torso is calculated without a sensor module configured on the torso of the user.

3. The system of claim 1, wherein the leaning angle is a forward leaning angle of the torso; and the vertical plane contains the front facing direction of the torso.

4. The system of claim 3, wherein the forward leaning angle of the torso is based on a larger one of angles of the projected lengthwise directions of the upper arms of the user relative to a vertical direction in the vertical plane.

5. The system of claim 1, wherein the leaning angle is a backward leaning angle of the torso; and the vertical plane contains the front facing direction of the torso.

6. The system of claim 5, wherein the backward leaning angle of the torso is based on a larger one of the angles of the projected lengthwise directions of the upper arms of the user above a predetermined threshold direction in the vertical plane.

7. The system of claim 6, wherein the predetermined threshold direction is forty five degrees above a horizontal direction in the vertical plane.

8. The system of claim 5, wherein the backward leaning angle of the torso is based on a smallest one of:
 a projection of a front facing direction of a head of the user in the vertical plane above a horizontal direction; and
 projections of the lengthwise directions of the upper arms of the user above a predetermined threshold direction in the vertical plane.

9. The system of claim 8, wherein the predetermined threshold direction is thirty degrees above the horizontal direction in the vertical plane.

10. The system of claim 1, wherein the leaning angle is a sideway leaning angle of the torso; and the vertical plane is perpendicular to the front facing direction of the torso.

11. The system of claim 10, wherein the sideway leaning angle is based on a difference between the projected lengthwise directions of the upper arms of the user in the vertical plane.

12. The system of claim 11, wherein the computing device is further configured to calculate a rotation of a hand of the user along a lengthwise direction of the hand that is on one of the arms of the user that has a larger one of angles of the projected lengthwise directions of the upper arms relative to a vertical direction in the vertical plane.

13. The system of claim 12, wherein the sideway leaning angle is proportional to the difference between the angles of the projected lengthwise directions of the upper arms relative to the vertical direction in the vertical plane and is proportional to the rotation of the hand.

14. The system of claim 1, wherein the computing device is further configured to calculate, using data from sensor modules attached to hands of the user, rotations of the hands of the user along lengthwise directions of the hands respectively.

15. The system of claim 14, wherein the sideway leaning angle is based on a weighted difference between angles of the projected lengthwise directions of the upper arms of the user relative to a vertical direction in the vertical plane, weighted according to the rotations of the hands of the user.

16. The system of claim 1, wherein each of the plurality of sensor modules further includes a communication device for a communication link with the computing device.

17. The system of claim 1, wherein the inertial measurement unit includes a micro-electromechanical system (MEMS) gyroscope.

18. The system of claim 17, wherein the inertial measurement unit further includes a magnetometer and a MEMS accelerometer.

19. A method, comprising:
 receiving, in a computing device, motion data from a plurality of sensor modules, each having an inertial measurement unit and attached to a portion of the user to identify an orientation of the portion of the user, wherein the plurality of sensor modules includes at least a first sensor module attached to a left upper arm of the user and a second sensor module attached to a right upper arm of the user;
 calculating, by the computing device, a front facing direction of a torso of the user;
 identifying, by the computing device, a type of a current pose of the user based at least in part on the sensor modules;
 selecting, by the computing device, a torso leaning model according to the type;
 projecting, by the computing device, lengthwise directions of upper arms of the user in a vertical plane that contains the front facing direction or is perpendicular to the front facing direction; and
 calculating, by the computing device, a leaning angle of the torso based on the projected lengthwise directions according to the selected torso leaning model.

20. A non-transitory computer storage medium storing instructions which, when executed by a computing device, instructs the computing device to perform a method, the method comprising:
 receiving, in the computing device, motion data from a plurality of sensor modules, each having an inertial measurement unit and attached to a portion of the user to identify an orientation of the portion of the user, wherein the plurality of sensor modules includes at least a first sensor module attached to a left upper arm of the user and a second sensor module attached to a right upper arm of the user;
 calculating, by the computing device, a front facing direction of a torso of the user;
 identifying, by the computing device, a type of a current pose of the user based at least in part on the sensor modules;
 selecting, by the computing device, a torso leaning model according to the type;
 projecting, by the computing device, lengthwise directions of upper arms of the user in a vertical plane that contains the front facing direction or is perpendicular to the front facing direction; and
 calculating, by the computing device, a leaning angle of the torso based on the projected lengthwise directions according to the selected torso leaning model.

* * * * *